(12) United States Patent
Zhao

(10) Patent No.: US 12,469,933 B2
(45) Date of Patent: Nov. 11, 2025

(54) BATTERY APPARATUS

(71) Applicant: CALB Co., Ltd., Jiangsu (CN)

(72) Inventor: Dong Zhao, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 535 days.

(21) Appl. No.: 17/967,900

(22) Filed: Oct. 18, 2022

(65) Prior Publication Data

US 2023/0378617 A1 Nov. 23, 2023

(30) Foreign Application Priority Data

May 17, 2022 (CN) .......................... 202210534851.9

(51) Int. Cl.
*H01M 50/516* (2021.01)
*H01M 50/503* (2021.01)
*H01M 50/507* (2021.01)
*H01M 50/552* (2021.01)
*H01M 50/588* (2021.01)
*H01M 50/593* (2021.01)

(52) U.S. Cl.
CPC ....... *H01M 50/516* (2021.01); *H01M 50/503* (2021.01); *H01M 50/507* (2021.01); *H01M 50/552* (2021.01); *H01M 50/588* (2021.01); *H01M 50/593* (2021.01)

(58) Field of Classification Search
CPC ............. H01M 50/516; H01M 50/503; H01M 50/507; H01M 50/593; H01M 50/528
See application file for complete search history.

(56) References Cited

U.S. PATENT DOCUMENTS

2018/0315974 A1 11/2018 Ing et al.

FOREIGN PATENT DOCUMENTS

| CN | 216413212 | 4/2022 |
|----|-----------|--------|
| EP | 3624220 | 3/2020 |
| WO | 2020235279 | 11/2020 |

OTHER PUBLICATIONS

"Search Report of Europe Counterpart Application", issued on May 13, 2024, pp. 1-6.

*Primary Examiner* — Sarah A. Slifka
(74) *Attorney, Agent, or Firm* — JCIP GLOBAL INC.

(57) ABSTRACT

The disclosure relates to the technical field of batteries and provides a battery apparatus. The battery apparatus includes a terminal component and a busbar. At least one of the terminal component and the busbar is provided with a welding identification portion, and the welding identification portion includes two notches opposite to each other.

10 Claims, 6 Drawing Sheets

BATTERY APPARATUS

CROSS-REFERENCE TO RELATED APPLICATION

This application claims the priority benefit of China application serial no. 202210534851.9, filed on May 17, 2022. The entirety of the above-mentioned patent application is hereby incorporated by reference herein and made a part of this specification.

BACKGROUND

Technical Field

The disclosure relates to the technical field of batteries, and in particular, relates to a battery apparatus.

Description of Related Art

In the related art, the position of welding between the battery terminal component and the busbar is not accurately positioned, so false welding may easily occur. Further, welding may even be positioned on the insulating member of the battery terminal component, leading to structural damage of the insulating member and the risk of insulation failure as a result.

SUMMARY

The disclosure provides a battery apparatus including a terminal component and a busbar. At least one of the terminal component and the busbar is provided with a welding identification portion, and the welding identification portion includes two notches opposite to each other.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
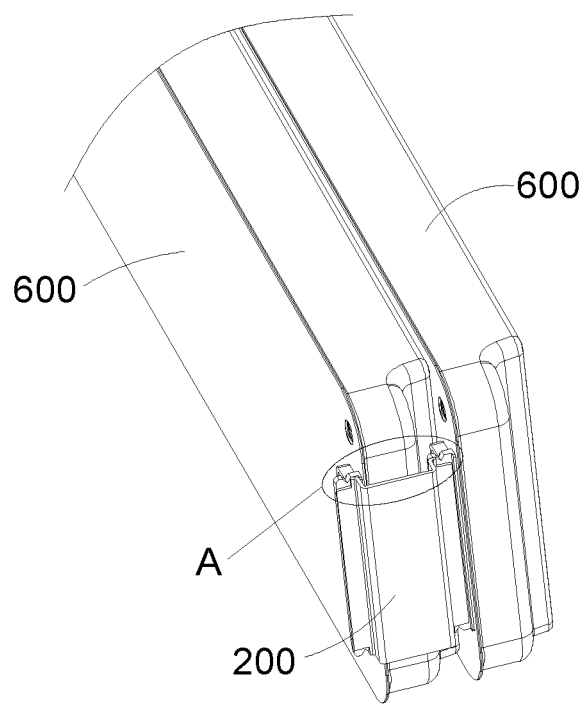
FIG. 1 is a local schematic view of a structure of a battery apparatus according to an embodiment of the disclosure.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

With reference to FIG. 1 to FIG. 11, the present embodiment provides a battery apparatus including a terminal component 100 and a busbar 200. At least one of the terminal component 100 and the busbar 200 is provided with a welding identification portion, and the welding identification portion includes two notches 300 opposite to each other.

In the battery apparatus provided by this embodiment, by arranging the welding identification portion on the terminal component 100, by arranging the welding identification portion on the busbar 200, or by arranging welding identification portions on both the terminal component 100 as well as the busbar 200, the positioning accuracy of welding is improved. The welding identification portion includes two opposite notches 300, and the two notches 300 may define a welding region between the terminal component 100 and the busbar 200. To be specific, the two notches 300 may define the center of the welding region between the terminal component 100 and the busbar 200, so that the positioning accuracy of welding between the terminal component 100 and the busbar 200 is improved.

In an embodiment, the battery apparatus further includes a battery 600, and the terminal component 100 is connected to the battery 600.

In an embodiment, the terminal component 100 includes a terminal 103 and an insulating member. The terminal 103 includes a first welding surface 104, at least a portion of the insulating member is located at two ends of the first welding surface 104, and the welding identification portion is disposed on the insulating member. The busbar 200 is provided with a relief space to expose the welding identification portion on the insulating member.

Figure 3:
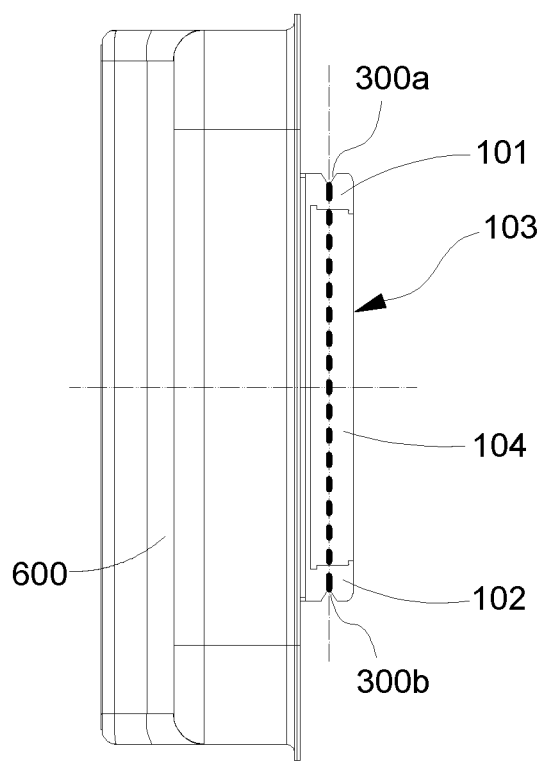
FIG. 3 is a structural schematic view of a battery matched with a terminal component in the battery apparatus according to an embodiment of the disclosure.

Exemplarily, with reference to FIG. 3, the welding region may be formed by the first welding surface 104 of the terminal 103. The contour of the first welding surface 104 is generally rectangular. The terminal 103 has two opposite long sides and two opposite short sides, and the length of the long sides is greater than the length of the short sides. The two short sides are individually named as a first short side and a second short side. One of the long sides is connected to a large surface of the battery 600, and the two short sides are both perpendicular to the large surface of the battery 600, where the large surface of the battery 600 refers to the side surface of the battery with the largest area.

In some embodiments, the insulating member and the terminal 103 are injection-molded. The insulating member includes a first insulating portion 101 and a second insulating portion 102. The first insulating portion 101 is located on the first short side, the second insulating portion 102 is located on the second short side, and the first insulating portion 101 and the second insulating portion 102 are opposite to each other.

The welding identification portion is arranged on the insulating member, and to be specific, the welding identification portion is provided on the first insulating portion 101 and the second insulating portion 102. In order to ensure that the busbar 200 may not block the welding identification portion during welding, a first relief space 202 is provided on the busbar 200 to expose the welding identification portion on the insulating member.

Figure 2:
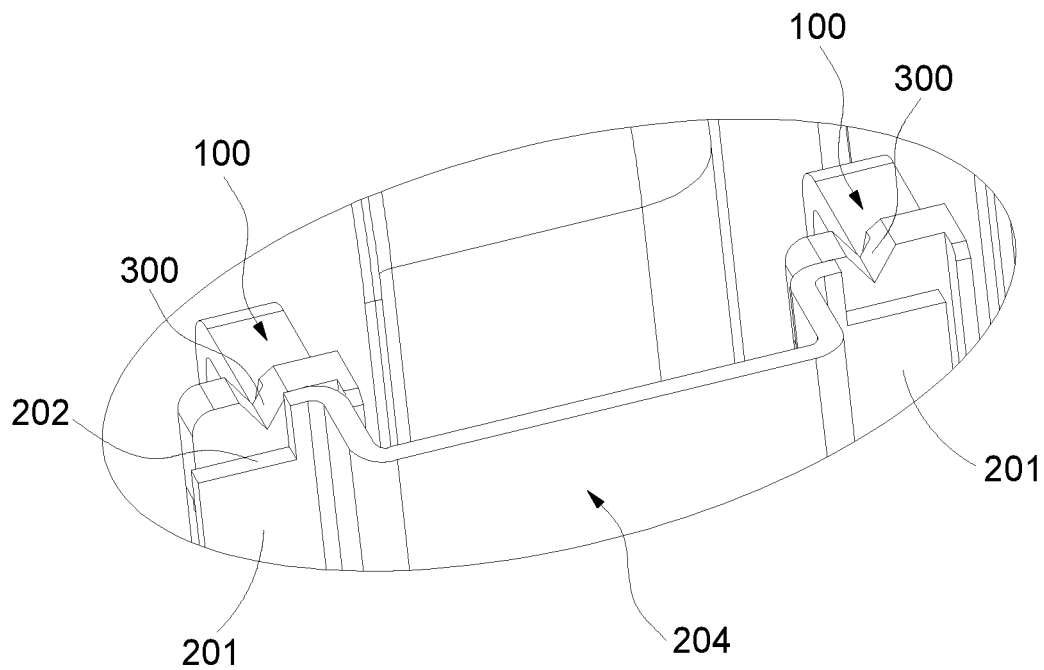
FIG. 2 is a local enlargement view of the portion A in FIG. 1.

Exemplarily, with reference to FIG. 1 and FIG. 2, flanges are formed on both sides of the busbar 200, and the flanges form welding ends 201 of the busbar 200. The number of welding ends 201 is two, and the two welding ends 201 are configured to be connected to the positive and negative electrodes of two adjacent batteries 600.

The first relief space 202 is a concave portion provided on the flange, and exemplarily, the concave portion is a right-angle notch.

It should be noted that the form of the relief space is not limited to the above, as long as the welding identification portion on the insulating member is exposed through the relief space.

In an embodiment, the two opposite notches 300 are axisymmetrically arranged. To be specific, the two opposite notches 300 are axisymmetrically arranged with respect to the center line (the double-dotted line in FIG. 3) of the terminal component 100 perpendicular to the large surface of the battery 600 as the axis of symmetry.

Exemplarily, the notches 300 are of an axisymmetric structure, the axis of symmetry is the center line of the notches 300, and the intersection of the axis of symmetry and the edge of the notches 300 is the midpoint of the notches 300.

In an embodiment, the two opposite notches 300 are located at two ends of the first welding surface 104.

With reference to FIG. 3, the two opposite notches 300 are individually named as a first notch 300a and a second notch 300b, the first notch 300a is disposed on the first insulating portion 101, and the second notch 300b is disposed on the second insulating portion 102.

In an embodiment, a connecting line between midpoints of the two opposite notches 300 is a welding reference line.

To be specific, the connecting line between the midpoint of the first notch 300a and the midpoint of the second notch 300b is the welding reference line. With reference to FIG. 3, the dotted line represents the welding reference line.

Exemplarily, both the first notch 300a and the second notch 300b are V-shaped notches. Each V-shaped notch has a tip, and the tip is the midpoint of the V-shaped notch. The tips of the two V-shaped notches are facing each other, and the connecting line between the tips of the two V-shaped notches is the welding reference line. It should be noted that the welding reference line is a virtual straight line.

When the busbar 200 and the terminal 103 are welded by the welding equipment, the welding equipment may recognize the welding reference line. Further, the welding torch swings on both sides of the reference line, so that the accuracy of welding is ensured.

It should be noted that the welding equipment is in the related art, and its structure and working principle is not to be described herein in detail.

In an embodiment, the welding reference line overlaps a center line of a welding surface of the terminal component 100.

With reference to FIG. 3, the dashed-dotted line represents the center line of the first welding surface 104 of the terminal component 100, and in order to ensure the clarity of the illustration, the dashed line in FIG. 3 is thickened. The dotted line overlaps the dashed line. When the welding trajectory of the welding torch oscillates on both sides of the welding reference line, it is ensured that the welding trajectory is located on both sides of the center line of the first welding surface 104. In this way, the busbar 200 is prevented from being welded onto the insulating member of the terminal component 100.

In an embodiment, the busbar 200 has a second welding surface 203, and a contour of the second welding surface 203 overlaps a contour of the first welding surface 104.

The busbar 200 has a first surface 204 and a second surface 205 opposite to each other. To be specific, each welding end 201 of the busbar 200 has a surface facing away from the battery and a surface facing the battery. Herein, the surface of the welding end 201 facing away from the battery is a portion of the first surface 204 of the busbar 200, and the surface of the welding end 201 facing the battery is a portion of the second surface 205 of the busbar 200.

The second welding surface 203 is the surface of the welding end 201 of the busbar 200 facing the battery. That is, the second welding surface 203 is adhered to the first welding surface 104 and is fixed by welding. The contour of the second welding surface 203 substantially overlaps the contour of the first welding surface 104, an in this way, it is ensured that the second welding surface 203 is aligned with the first welding surface 104, and precise welding may thus be easily performed.

It should be noted that, the contour of the second welding surface 203 overlapping the contour of the first welding surface 104 means that the contour of the second welding surface 203 and the contour of the first welding surface 104 substantially overlap.

In an embodiment, the first relief space is formed by the welding identification portion disposed on the busbar 200. That is, both the insulating member of the terminal component 100 and the busbar 200 are provided with welding identification portions.

Exemplarily, the welding identification portion on the busbar 200 overlaps the welding identification portion on the insulating member. To be specific, the welding identification portion on the busbar 200 also includes two V-shaped notches. The two V-shaped notches are opposite to each other and are arranged at both ends of the flanges, and the V-shaped notches on the flanges correspond to the V-shaped notches on the insulating member one by one.

It should be noted that the welding identification portion on the busbar 200 and the welding identification portion on the insulating member may also partially overlap. Exemplarily, the projections of the tips of the V-shaped notches on the flanges overlap the tips of the V-shaped notches on the insulating member corresponding to their positions on the first welding surface, or the projections of the tips of the V-shaped notches on the flanges on the first welding surface is located outside the V-shaped notches on the insulating member. The included angle between the two side walls of each V-shaped notch on the flange is not less than the included angle between the two side walls of each V-shaped notch on the insulating member.

Figure 5:
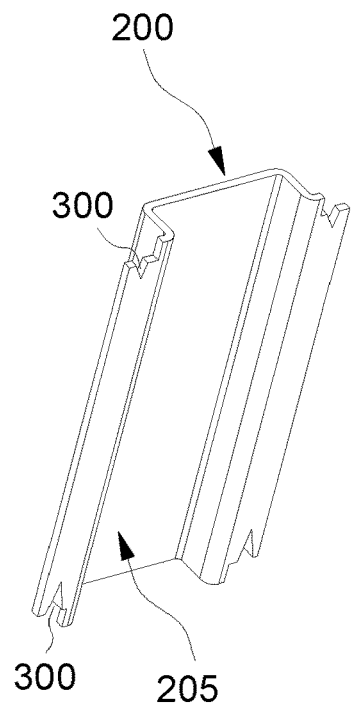
FIG. 5 is a structural schematic view of a variation example of the busbar in the battery apparatus according to an embodiment of the disclosure.

In some embodiments, the welding identification portion may also be arranged only on the busbar 200. With reference to FIG. 5, the welding identification portion on the busbar 200 also includes two notches 300, and the two notches 300 are opposite to each other and are arranged at both ends of the flange. Both the notches are V-shaped notches.

It should be noted that the shape of the two notches 300 is not limited to be V-shaped, as long as the connecting line between the two notches 300 may be easily recognized by the welding equipment. For instance, the shape of the two notches 300 may also be U-shaped, trapezoidal, or rectangular.

In an embodiment, a plurality of busbars 200 are provided, and insulating films 400 are provided on outer surfaces of the plurality of busbars 200. Each of the insulating films 400 is provided with a second relief space, and the second relief space corresponds to the welding region to expose the welding region. The insulating films 400 on two adjacent busbars 200 are connected through a buffer structure 500.

In order to facilitate welding and further improve the welding efficiency, an insulating film 400 is provided on the outer surface of each busbar 200, and the insulating films 400 on two adjacent busbars 200 are connected as a whole through the buffer structure 500 to form a wire harness assembly.

Figure 6:
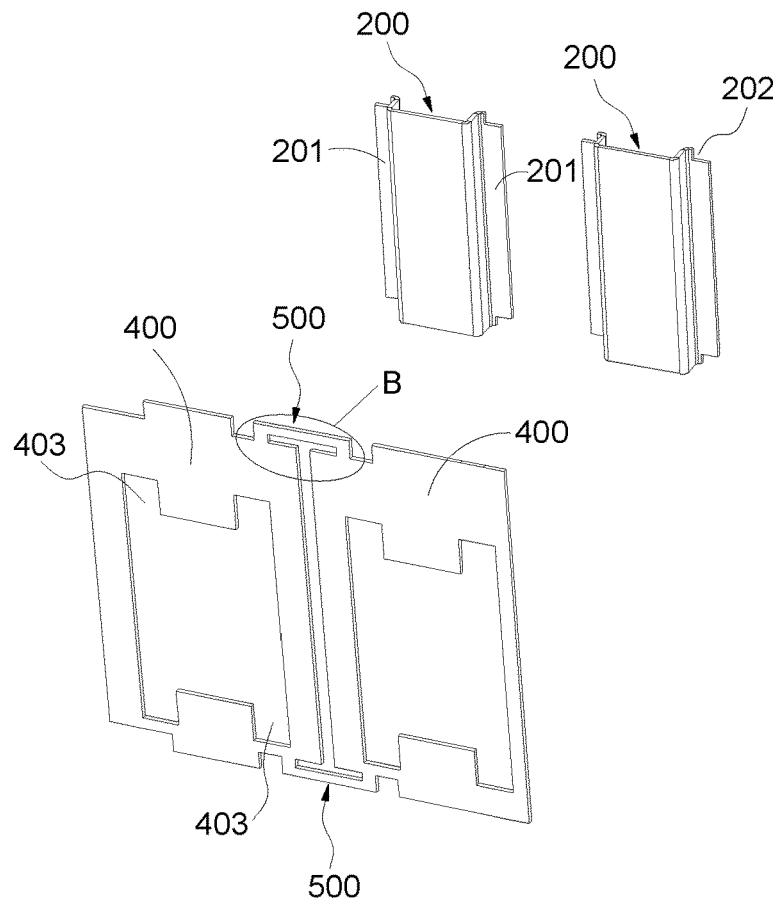
FIG. 6 is an exploded view of the busbars and insulating films in the battery apparatus according to an embodiment of the disclosure.

Exemplarily, with reference to FIG. 6, the second relief space may be a relief hole 403, and the relief hole 403 corresponds to the welding ends 201, so that the welding region on the welding ends 201 is exposed, and the welding ends 201 may be easily welded and fixed onto the terminal 103 of the battery.

It should be noted that each second relief space is not limited to the relief hole 403, but may also be an open second relief space. For instance, the insulating film 400 includes two sub-film segments, a gap is provided between the two sub-film segments in the length direction of the busbar 200, and the space between the two sub-film segments is the second relief space. As long as it can be ensured that the welding region on the welding ends 201 of the busbar 200 is exposed to the outside of the insulating film 400.

Since the buffer structure 500 may improve the buffer strength between the busbars 200, tearing of the insulating films 400 caused by the stress concentration between the busbars 200 may be prevented from occurring as much as possible during assembly or use.

In some embodiments, the insulating films 400 are bonded and fixed to the busbars 200, so that the fixing strength of the busbars 200 may be ensured, and the deviation of the busbars 200 from the welding positions is prevented from occurring.

In an embodiment, the buffer structure 500 and the insulating film 400 are integrally formed. To be specific, the buffer structure 500 is a portion of the insulating film 400. In this way, the overall mechanical strength and buffering performance of the insulating film 400 are improved, the tearing of the insulating film 400 caused by the stress concentration between the busbars 200 is prevented from occurring, and the service life of the wire harness assembly is prolonged.

The buffer structure 500 and the insulating film 400 are integrally formed, and the busbars 200 may thus be integrated to form a wire harness assembly, which is convenient for assembly.

In an embodiment, each buffer structure 500 includes an elastic member, gaps are provided between at least portions of the buffer structure 500 and the insulating films 400, or the buffer structure 500 is a curved structure located between two adjacent busbars 200.

In some embodiments, the buffer structures 500 includes the elastic members.

Exemplarily, the buffer structures 500 are elastic films. Each buffer structure 500 may be connected between two adjacent insulating films 400 or may be connected across the top ends or bottom ends of the two adjacent insulating films 400. Alternatively, one buffer structure 500 is connected across the top ends of two adjacent insulating films 400, and one buffer structure 500 is also connected across the bottom ends of the two adjacent insulating films 400. When the buffer structure 500 is connected across the top or bottom ends of two adjacent insulating films 400, a gap is provided between the two adjacent insulating films 400, and the buffer structure 500 is connected to the two adjacent insulating films 400 across the gap, so as to ensure that the buffer structure 500 may be elastically deformed.

Figure 8:
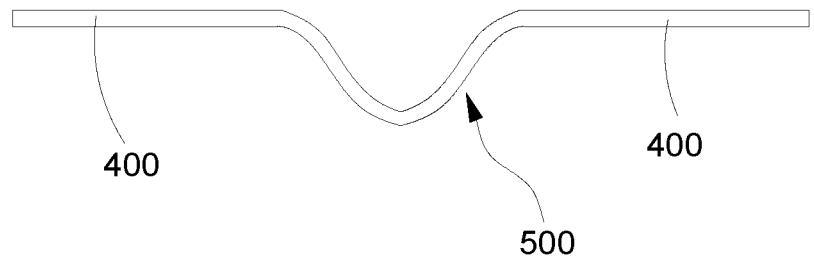
FIG. 8 is a structural schematic view of a variation example of a buffer structure according to an embodiment of the disclosure.

In an embodiment, with reference to FIG. 8, the buffer structure 500 is a curved structure located between two adjacent insulating films 400.

The two adjacent insulating films 400 are integrally formed with the curved structure, that is, the curved structure is a portion of the insulating films 400. After the busbar 200 is welded and fixed to the terminal 103 of the battery, the curved structure is located between two adjacent busbars 200.

Exemplarily, since two notches 300 are arranged opposite to each other at two ends of the first welding surface 104 of the terminal 103, the connecting line between the two opposite notches 300 is a welding reference line. When the busbar 200 is welded onto the terminal 103 of the battery, the welding equipment may recognize the abovementioned welding reference line and oscillate on both sides of the welding reference line, and precise welding is thus achieved. After the welding is completed, the curved structure is located between two adjacent busbars 200, so that the stress concentration between the busbars 200 may be relieved or eliminated during subsequent use (e.g., when the battery swells), and the risk of tearing of the insulating films 400 is effectively reduced.

In some embodiments, gaps are provided between at least portions of the buffer structure 500 and the insulating films 400.

To be specific, a gap is provided between two adjacent insulating films 400, that is, a gap is provided between two sidewalls of two adjacent insulating films 400 that are close to each other. Gaps being provided between at least portions of the buffer structure 500 and the insulating films 400 ensures that a buffer space is provided between the first film segment and the second film segment.

Gaps may be provided between at least portions of the buffer structure 500 and the top ends of the insulating films 400 or the sidewalls of the insulating films 400. Herein, with reference to FIG. 6 and FIG. 11, the top and bottom ends of the insulating films 400 refer to the edges of the insulating films 400 parallel to the arrow direction X, and the sidewalls of the insulating films 400 refer to the sides of the insulating films 400 that are perpendicular to the top and bottom ends thereof.

Exemplarily, each the buffer structure 500 includes a first connection segment 501, a second connection segment 502, and a third connection segment 503. The first connection segment 501 is connected to one of the insulating films 400, the second connection segment 502 is connected to another insulating film 400, and the third connection segment 503 is connected between the first connection segment 501 and the second connection segment 502, so that the buffer structure 500 is formed into a zigzag structure.

Exemplarily, the number of buffer structures 500 is two, and the two buffer structures 500 are formed integrally with the insulating films 400. One of the buffer structures 500 is connected above two adjacent insulating films 400, and the other buffer structure 500 is connected below two adjacent insulating films 400.

The following description will be given by taking the buffer structure 500 connected above two adjacent insulating films 400 as an example.

Figure 7:
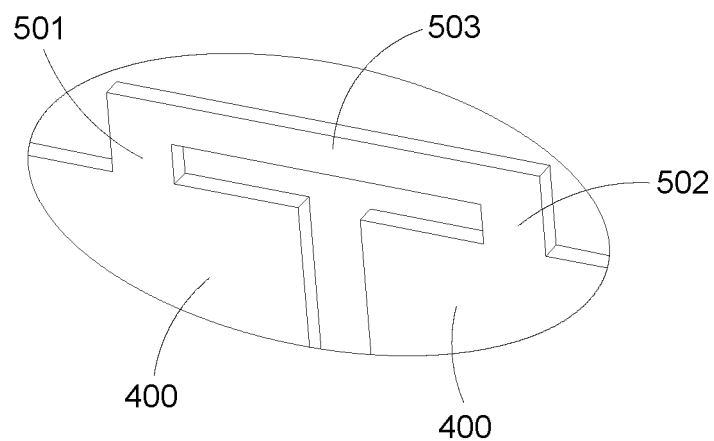
FIG. 7 is a local enlargement view of the portion B in FIG. 6.

To be specific, with reference to FIG. 7, the first connection segment 501 is integrally formed with the top end of one of the insulating films 400, the second connection segment 502 is integrally formed with the top end of another insulating film 400, and the third connection segment 503 is connected between the first connection segment 501 and the second connection segment 502, so that the buffer structure 500 is formed into a zigzag structure. Herein, gaps are provided between the third connection segment 503 and the top ends of two adjacent insulating films 400, and a gap is also provided between the two adjacent insulating films 400. When two adjacent busbars 200 tend to move away from each other, at least the first connection segment 501 and the second connection segment 502 are deformed in the stacking direction of the batteries, and a buffering effect is thus provided. In this way, the tearing of the insulating films 400 caused by the stress concentration between the busbars 200 is prevented from occurring, and the service life of the wire harness assembly is prolonged.

In an embodiment, the first connection segment 501, the second connection segment 502, and the third connection segment 503 are integrally formed. To be specific, the first connection segment 501, the second connection segment 502, and the third connection segment 503 are integrally formed with the insulating films 400. In this way, production and processing may be easily performed, and the overall structural strength and buffering performance of the wire harness assembly may be improved.

It should be noted that the buffer structure 500 may also be an S-shaped structure or a Z-shaped structure. The S-shaped structure and the Z-shaped structure may be connected in a gap between two adjacent insulating films 400.

It should be noted that the buffer structure 500 is not limited to the above several forms, and other forms of the buffer structure 500 may also be selected according to actual needs.

In some embodiments, each insulating film 400 includes a first insulating film 401 and a second insulating film 402, the first insulating film is located on the first surface 204 of the busbar 200, and the second insulating film 402 is located on the second surface 205 of the busbar 200.

Figure 4:
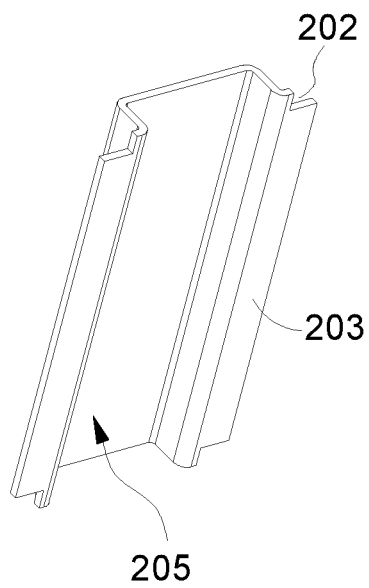
FIG. 4 is a structural schematic view of a busbar in the battery apparatus according to an embodiment of the disclosure.
Figure 9:
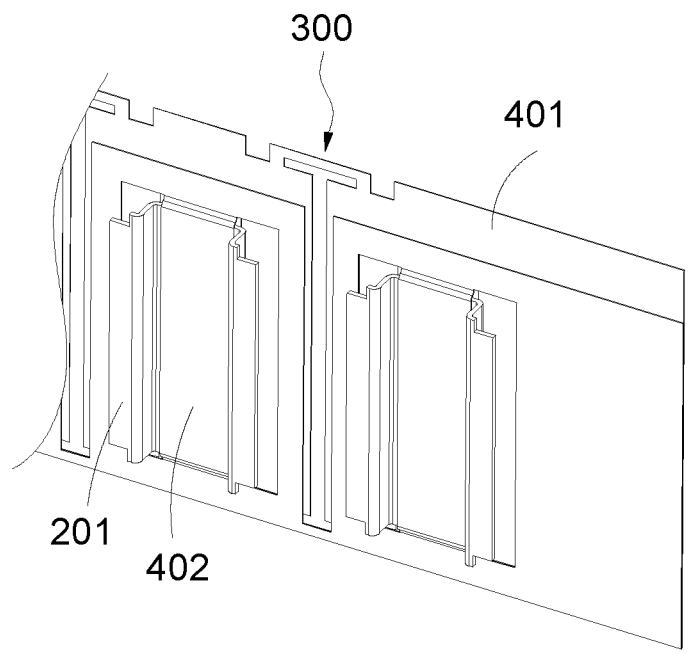
FIG. 9 is a structural schematic view of the busbars matched with the insulating films in the battery apparatus according to an embodiment of the disclosure.
Figure 10:
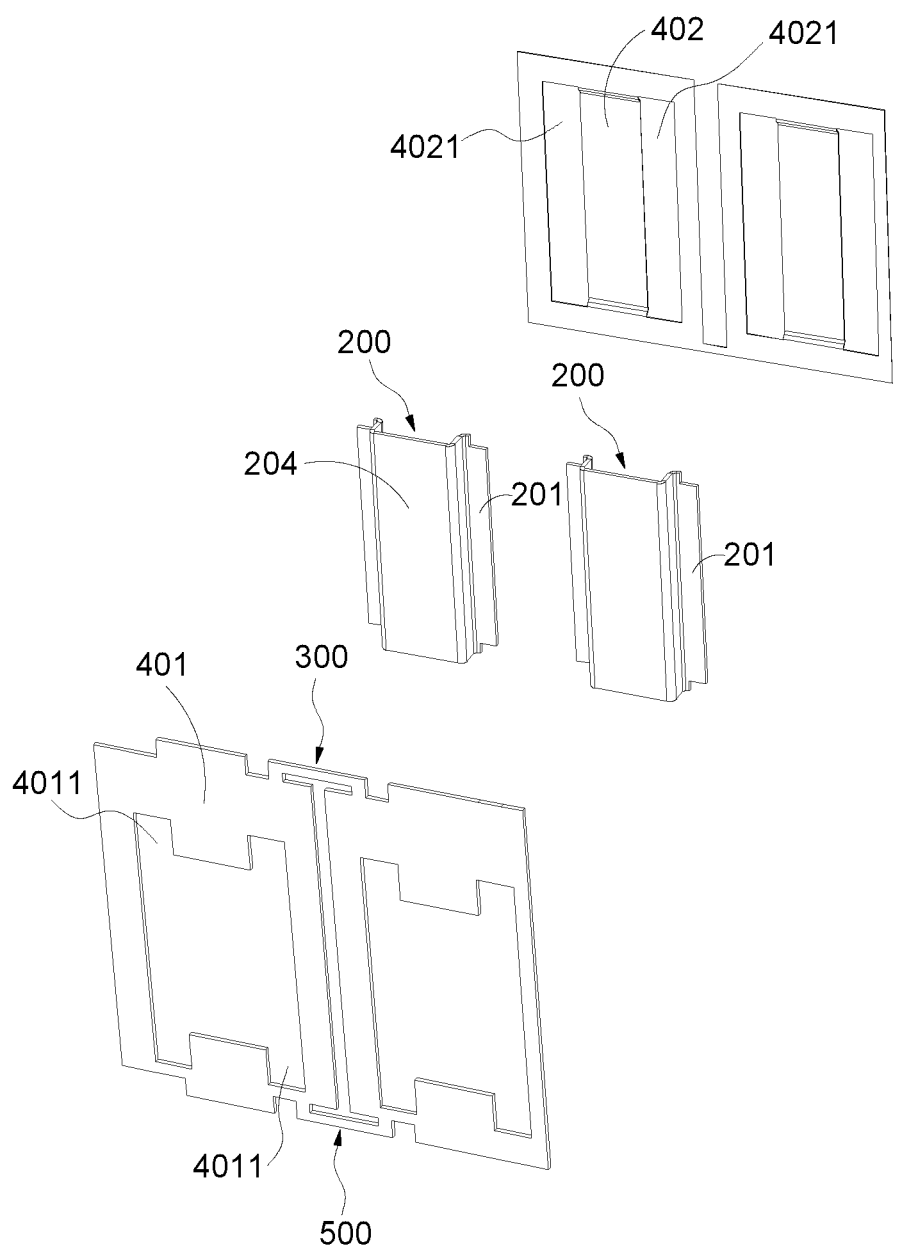
FIG. 10 is an exploded view of a variation example of the busbars and the insulating films in the battery apparatus according to an embodiment of the disclosure.
Figure 11:
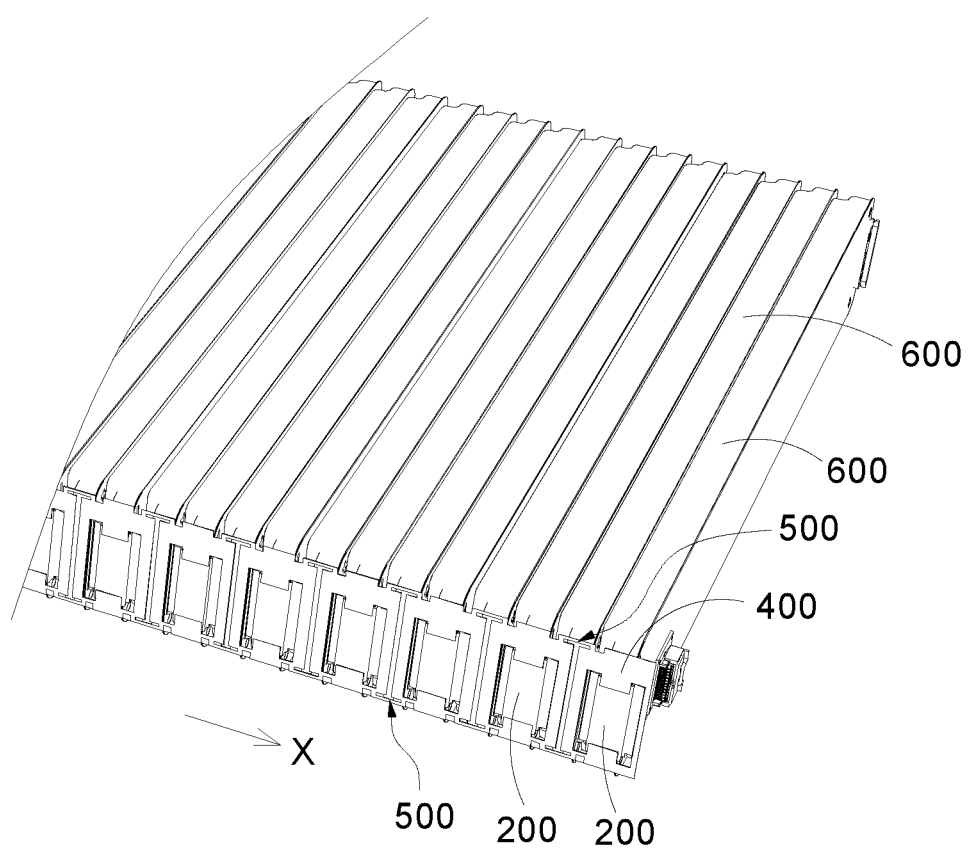
FIG. 11 is a local schematic view of the structure of a variation example of the battery apparatus according to an embodiment of the disclosure.

With reference to FIG. 4, FIG. 9, and FIG. 10, the first insulating film 401 is adhered to at least a portion of the first surface 204 of the busbar 200, and the second insulating film 402 is adhered to at least a portion of the second surface 205 of the busbar 200. In this way, the fixing strength of the insulating film 400 to the busbar 200 may be enhanced, and the problem of inaccurate welding and positioning caused by the loosening of the busbar 200 may be prevented from occurring.

The second relief space includes a first through hole 4011 arranged on the first insulating film 401 and a second through hole 4021 arranged on the second insulating film 402. To be specific, the first through hole 4011 on the first insulating film 401 may expose at least a portion of the surface of the welding end 201 facing away from the battery, and the second through hole 4021 on the second insulating film 402 may expose at least a portion of the surface of the welding end 201 facing the battery. In this way, it is convenient to use welding equipment to weld and fix the welding end 201 on the terminal 103 of the battery. That is, it is convenient to use welding to weld the welding region between the terminal component 100 and the busbar 200.

It should be understood that the first through hole 4011 and the second through hole 4021 together form the second relief space.

In some embodiments, with reference to FIG. 10, the number of buffer structures 500 is two, and the two buffer structures 500 are formed integrally with the first insulating film 401.

In an embodiment, first insulating film 401 is connected to the second insulating film 402 through hot pressing.

The first insulating film 401 and the second insulating film 402 are connected by a hot pressing process, so that the busbar 200 is fixed between the first insulating film 401 and the second insulating film 402. Herein, the hot pressing process is the related art, and description thereof is not provided in detail herein.

It should be noted that the first insulating film 401 and the second insulating film 402 may also be integrally formed, as long as the busbar 200 may be fixed and the welding end 201 of the busbar 200 may be welded and fixed to the terminal 103 of the battery.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery apparatus, comprising a terminal component and a busbar, wherein at least one of the terminal component and the busbar is provided with a welding identification portion, and the welding identification portion comprises two notches opposite to each other,
wherein the two opposite notches are axisymmetrically arranged.

2. The battery apparatus according to claim 1, wherein the terminal component comprises a terminal and an insulating member, the terminal comprises a first welding surface, at least a portion of the insulating member is located at two ends of the first welding surface, the welding identification portion is disposed on the insulating member, and the busbar is provided with a first relief space to expose the welding identification portion on the insulating member.

3. The battery apparatus according to claim 2, wherein the two opposite notches are located at two ends of the first welding surface.

4. The battery apparatus according to claim 2, wherein the busbar has a second welding surface, and a contour of the second welding surface overlaps a contour of the first welding surface.

5. The battery apparatus according to claim 2, wherein the first relief space is formed by the welding identification portion disposed on the busbar.

6. The battery apparatus according to claim 1, wherein a connecting line between midpoints of the two opposite notches is a welding reference line.

7. The battery apparatus according to claim 6, wherein the welding reference line overlaps a center line of a welding surface of the terminal component.

8. The battery apparatus according to claim 1, wherein both the two notches are V-shaped notches.

9. The battery apparatus according to claim 1, wherein a plurality of busbars are provided, insulating films are provided on outer surfaces of the plurality of busbars, each of the insulating films is provided with a second relief space, the second relief space corresponds to welding ends of the busbar to expose at least portions of the welding ends, and the insulating films on two adjacent busbars are connected through a buffer structure.

10. The battery apparatus according to claim 9, wherein each buffer structure comprises an elastic member, gaps are provided between at least portions of the buffer structure and the insulating films, or the buffer structure is a curved structure located between two adjacent busbars.

* * * * *